Patented Apr. 17, 1934

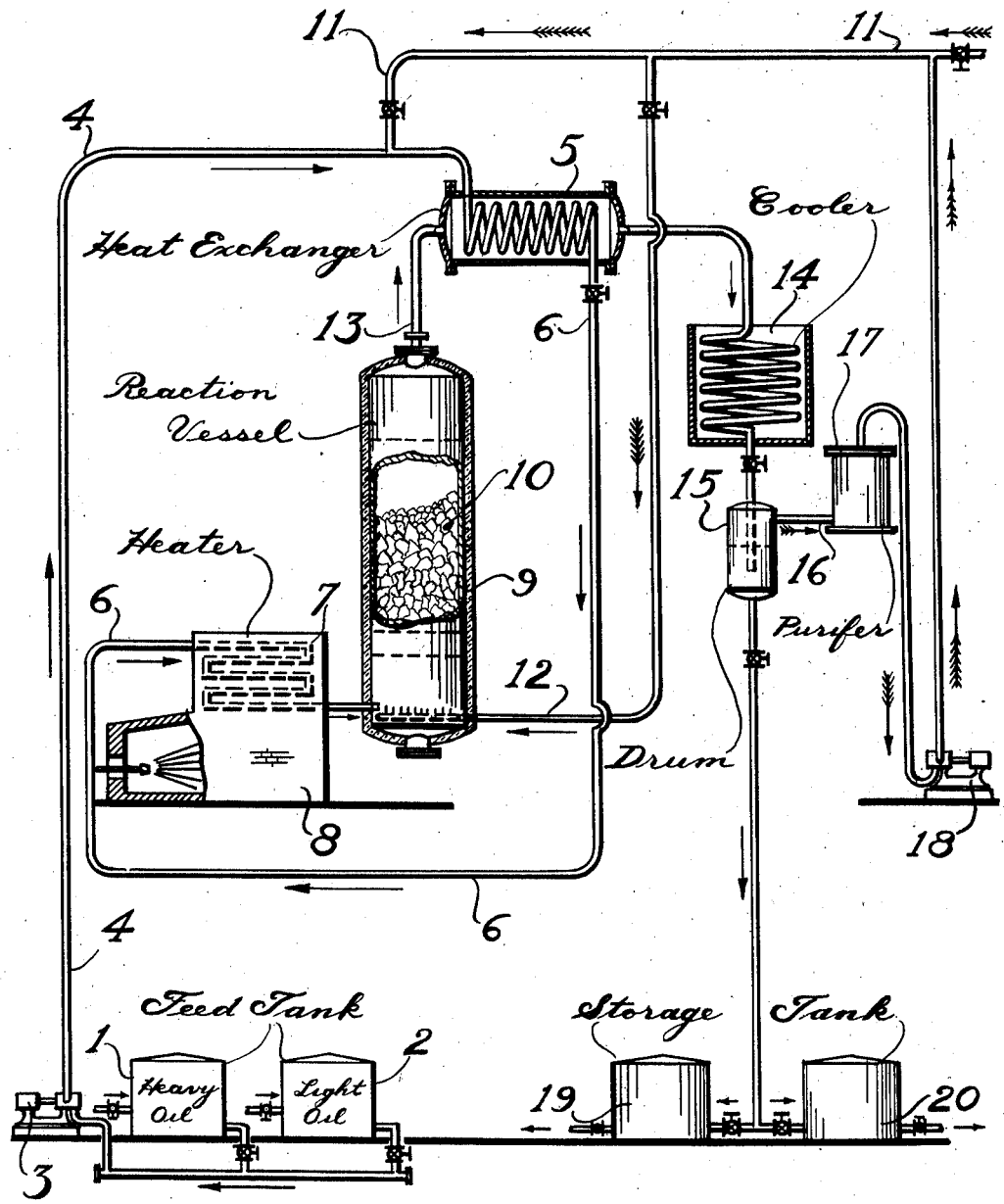

1,955,253

UNITED STATES PATENT OFFICE 1,955,253

PROCESS FOR CATALYTIC HYDROGENATION OF HYDROCARBON OIL AND FOR THE REACTIVATION OF THE CATALYST THEREFOR

Robert P. Russell and Marion W. Boyer, Baton Rouge, La., assignors to Standard-I. G. Company Application October 17, 1929, Serial No. 400,226

6 Claims. (Cl. 196—53)

The present invention relates to improvements in the art of producing valuable products from petroleum, shale or coal oils and the like by the action of high pressure hydrogen at elevated temperature in the presence of a suitable catalytic material. Our improved process will be fully understood from the following description and the drawing which illustrates one form of apparatus suitable for the purpose.

The drawing is a semi-diagrammatic view in sectional elevation of an apparatus constructed according to our invention and indicates the flow of materials.

In a co-pending application Serial No. 407,019 filed November 13, 1929, by Edward B. Peck, a process for revivification of catalysts and for a method of maintaining catalytic activity was disclosed. The present invention is an improvement over the method disclosed by Peck.

Referring to the drawing reference numeral 1 denotes a feed tank containing heavy distillate oil such as lubricating oil from Colombia, California or other asphaltic or semi-asphaltic base crude and 2 denotes a light oil feed tank containing kerosene distillate or the like which is, of course, considerably lighter and lower boiling than the oil in tank 1.

Oil from either tank 1 or 2 is forced by pump 3 through line 4 and heat exchanger 5 and thence by line 6 to the inlet of a heater 7. The heater is preferably a fired coil arranged in a suitable furnace setting 8 and is capable of raising the temperature of the oil stream in excess of 800° F. Coil 7 discharges into a reaction vessel 9, which is adapted to withstand the temperature and pressure in excess of 200 atmospheres as well as the corrosive effects of the oil and hydrogen. The drum is packed with a suitable catalyst 10.

Hydrogen or a gas rich in the same is supplied under high pressure by line 11 and a part may be admixed with the oil prior to flow through exchanger 5. Part may be supplied directly to drum 9 by means of branch line 12.

The mixture of oil and gas is discharged from the drum through line 13 through heat exchanger 5 and cooler 14 to separation drum 15 from which gas is removed by line 16. The gas may be purified in a suitable system shown generally at 17 and which may comprise an oil scrubbing system to remove hydrogen sulphide hydrocarbon constituents, although other suitable means may be employed. Purified gas is recompressed by booster pump 18 and forced into line 11 for recirculation.

The oil from separation drum 15 may be drawn off to storage tanks 9 and 20 for heavy and light oil respectively.

In the treatment of mineral oils with hydrogen under high pressure at temperatures over about 750° F. we have observed the same decrease in catalytic activity noted by Peck in the above mentioned application. We have found it more convenient however to use solid, lump catalyst instead of the finely ground suspended catalyst used by Peck. It is preferable not to remove the catalyst from the oven and we have found that it may be washed in situ with a suitable solvent such as naphtha, kerosene, acetone, carbon disulphide or carbon tetrachloride, and the like. We have also observed that the asphaltic or tarry material which appears to coat the catalytic surface is not formed to any appreciable degree when oils such as kerosene and the like are treated with high pressure hydrogen and that it is possible to alternate using heavier and then lighter oils in the same retorts for periods of a week or two weeks so that although the catalyst activity drops slowly during the heavy oil treatment, it is revivified by the action of the light oil before its activity has fallen below a satisfactory degree. Revivification is much more rapid in the presence of hydrogen.

In the catalytic treatment of heavier oils the temperature is in excess of about 700° F. and preferably in the range from 750 to 875° F. with pressure in excess of 20 atmospheres but preferably from 100 to 200 atmospheres or higher. The catalysts are preferably of the sulfactive type such as metal oxides such as those of the metals of the sixth group of the periodic system of elements. These oxides may be mixed with the oxides of other elements such as alkalies, alkaline earths, rare earths, aluminum, zinc and the like and packed in coarse lumps in the reaction chamber. Under these conditions heavy distillate oils such as those derived from Coastal or Colombia crudes may be subjected to high pressure hydrogen treatment and greatly improved by increase of the A. P. I. gravity, reduction of sulphur and improvement of color and color stability. The viscosity of the total oil recovered, which may be over 100% by volume of the feed, is considerably decreased but this product may be distilled and cuts of various viscosities can be obtained. These cuts are much superior to the corresponding crude oil cuts and may be made equal to or better than similar cuts from Pennsylvania or equivalent crudes. During this treatment a slow decrease in catalyst activity is noted.

When the activity has fallen below the satisfactory degree as shown by the oil produced, the oil flow may be discontinued and the drum cooled. The solvent is then pumped, preferably under pressure, through the drum for a period ranging from two to three days or longer, after which the heavy oil flow may be resumed. Solvents other than hydrocarbons may be used at low temperatures and without hydrogen but it is preferable to use hydrocarbon oils and to pass hydrogen through the drum together with the solvent. In this case it is desirable to maintain the drum at a temperature above about 700° F. and at full pressure and to use as the solvent a poor grade of kerosene which by reason of high sulphur content and/or tendency to produce a smoky flame in a lamp is unsatisfactory as a burning oil. The oil is greatly improved and will be found to be satisfactory for illuminating purposes after such treatment, followed by alkali washing and redistillation and at the same time the catalyst is brought back apparently to its original activity. The rate of hydrogen circulation is in excess of about 3000 cu. ft./barrel of oil during the heavy oil treatment and when kerosene is used for revivification it may be maintained at about the same rate.

According to our preferred method, operation is alternated between treatment of heavy oil and light oil. The period need not be the same for each treatment and we have found that light oil treatment for one day is satisfactory for bringing back catalyst activity. On the other hand it is desirable from a practical standpoint to make the periods a week or more.

Our invention is not to be limited by any theory of the mechanism of the process nor by any particular means for accomplishing its purpose but only to the following claims in which we wish to claim all novelty inherent in the invention.

We claim:

1. An improved process for the catalytic hydrogenation of heavy fractions from asphaltic or semi-asphaltic base crude oils which comprises passing such heavy fractions with hydrogen through a zone packed with lumps of sulfactive catalytic material and maintained under high pressure above about 20 atmospheres and at elevated temperature in the range required to effect substantial hydrogenation until the activity of the catalytic material for hydrogenating purposes as indicated by the nature of the product produced has fallen below a satisfactory degree, then discontinuing the flow of heavy oil, passing a solvent neutral for tarry material through the catalytic zone for a prolonged period under substantially the same pressure but at lower temperature, and then recontinuing the flow of heavy oil under the original conditions of temperature and pressure.

2. Process according to claim 1 in which the solvent is a hydrocarbon oil lighter than the heavy oil being treated.

3. Process according to claim 1 in which the solvent is a light petroleum fraction substantially free of asphalt.

4. In the hydrogenation of heavy hydrocarbon oils containing asphaltic materials at elevated pressure and temperature in a process which comprises passing said oil with hydrogen through a hydrogenation zone packed with lumps of a sulfactive catalyst which decreases in activity during operation due to accumulation of tarry material thereon, an improved method of operation comprising discontinuing the flow of said heavy oil, passing a neutral liquid solvent for said tarry material through said reaction zone to remove said tarry material and to increase the activity of said catalyst, and then resuming the flow of said heavy oil under the original conditions of temperature and pressure.

5. Process according to claim 4 in which the solvent is a light hydrocarbon oil substantially free of asphalt.

6. Process for the destructive hydrogenation of heavy hydrocarbon oils containing asphaltic material, which comprises passing said oil with hydrogen through a hydrogenation zone packed with lumps of a sulfactive catalyst at a pressure above 20 atmospheres and a temperature within the destructive hydrogenation range until said catalyst undergoes a decrease in activity due to accumulation of tarry material, then discontinuing the flow of said heavy oil and passing a relatively lighter hydrocarbon oil substantially free of asphalt with hydrogen through said reaction zone at a pressure above about 20 atmospheres and a temperature in the hydrogenation range whereby the activity of said catalyst is increased, then resuming the flow of said heavy oil under the original conditions of temperature and pressure.

ROBERT P. RUSSELL.
MARION W. BOYER.